United States Patent [19]

Halushka et al.

[11] 4,260,180

[45] Apr. 7, 1981

[54] MECHANICAL COUPLING

[75] Inventors: Roman A. Halushka, Santa Monica; George A. McGowan, Westminster, both of Calif.

[73] Assignee: Hughes Aircraft Company, Culver City, Calif.

[21] Appl. No.: 59,795

[22] Filed: Jul. 23, 1979

[51] Int. Cl.³ .............................................. F16L 55/00
[52] U.S. Cl. .................................. 285/9 M; 285/85; 285/391
[58] Field of Search ................... 285/9 M, 84, 85, 391; 403/DIG. 1, 319

[56] References Cited

U.S. PATENT DOCUMENTS

| 290,663 | 12/1883 | Blue | 285/391 X |
|---|---|---|---|
| 808,446 | 12/1905 | Gill et al. | 285/85 |
| 1,857,420 | 5/1932 | Wolford | 285/85 |
| 3,104,088 | 9/1963 | Cator | 285/9 M X |
| 3,181,895 | 5/1965 | Cator | 285/9 M X |
| 3,575,446 | 4/1971 | Brantley | 285/85 |
| 3,741,519 | 6/1973 | Moyer | 285/9 M X |

Primary Examiner—Thomas F. Callaghan
Attorney, Agent, or Firm—Kenneth W. Float; W. H. MacAllister

[57] ABSTRACT

Apparatus is provided comprising non-magnetic male and female coupling sections having reciprocally mating interrupted screw portions. The male section has a permanent magnet disposed in a first cylindrical chamber in the mating end thereof. The female section has a movable magnetic plunger captively disposed in a second cylindrical chamber in the mating end thereof which is free to enter the first chamber when the male and female sections are properly aligned and the interrupted screw portions are locked. Magnetic attraction holds the plunger in the first chamber. The male and female sections are thus precluded from further rotation relative to one another. A strong external magnet is used to withdraw the plunger from the first chamber thus allowing rotation and demating of the male and female sections.

3 Claims, 7 Drawing Figures

MECHANICAL COUPLING

The present invention relates generally to mechanical couplers and more particularly to mechanical couplers which incorporate magnetic locking devices.

BACKGROUND OF THE INVENTION

The present state of the art related to sonar towed arrays involves the use of electrical or fiber optic cables for the transmission of data between a pressure transducer and processing electronics located in a submarine or surface vessel. Generally the array is towed up to a mile or so behind the submarine or surface vessel, and the array may be on the order of 1500 feet in length and one inch in diameter. The towed array is generally made in sections of about 300 feet or so which requires a mechanical coupling between sections to secure the 1500 foot array together.

Any mechanical coupler used in the towed arrays must be sealed to prevent water contamination of the fiber optic waveguides, electrical conductors, or the transducers inside the towed array. Present couplers have generally incorporated a number of screws to lock the coupler together. It is necessary to seal the screws to prevent water intrusion, however the general sealing capability has always been very poor and unreliable. Additionally, use of screws which were of a dissimilar metal than the coupler has led to screw erosion because of the galvanic action between the two dissimilar metals. This galvanic action has caused leakage which has produced generally catastrophic failures including loss of the towed array transducer. Also mating and demating of such mechanical couplers has generally been time consuming and has involved use of special tools to accomplish these tasks.

In addition the presently existing mechanical couplers are bulky and not very streamlined along the outside surface of the coupler. The non-streamlined design has led to turbulance which produces unwanted towed array self-noise.

SUMMARY OF THE INVENTION

Accordingly it is an object of the present invention to provide a mechanical coupler which is streamlined and self-sealing.

It is the further object of the present invention to provide a mechanical coupler which requires no tools for the coupling operation.

Another object of the present invention is to provide a coupler which provides for rapid assembly and disassembly and which will not inadvertently uncoupled while in operation.

In accordance with these and other objects of the present invention there is provided a mechanical coupler comprising a first non-magnetic cylindrical section having an inner and an outer surface, the outer surface having an interrupted screw portion thereof. A permanent magnet is disposed in one end of the first section at the bottom of a first cylindrical chamber adjacent to the interrupted screw portion. A second non-magnetic cylindrical section having an inner and an outer surface is provided with the inner surface having an interrupted screw portion thereof. The interrupted screw portion of the second section reciprocally mates with the interrupted screw portion of the first section the two sections being locked together by a fraction of a turn of the second section relative to the first section. A movable magnetic plunger is captively disposed in one end of the second section in a second cylindrical chamber and which slides within the second chamber. The movable magnetic plunger is free to enter the first cylindrical chamber once the second section is aligned with and locked relative to the first section. When the second section is turned by the fraction of a turn thereof, further relative motion between the first and second sections is prevented thereby.

An O-ring seal is provided in the first cylindrical section which completely seals the inner portion of the coupler so as to prevent intrusion of liquid, or gases, or the like. Once the two cylindrical sections have been mated, the resulting outer surface is completely streamlined, thus providing for minimum turbulence and drag.

In order to unlock the two mated cylindrical sections, it is necessary to utilize a strong permanent magnet to withdraw the movable magnetic plunger from the first cylyndrical chamber. Once this is accomplished both cylindrical sections are free to rotate and thus may be demated.

BRIEF DESCRIPTION OF THE DRAWINGS

The foregoing and other objects and features of the present invention may be more readily understood with reference to the following detailed description taken in conjunction with the accompanying drawings, when like reference numerals designate like structural elements, and in which.

DETAILED DESCRIPTION

Figure 1:
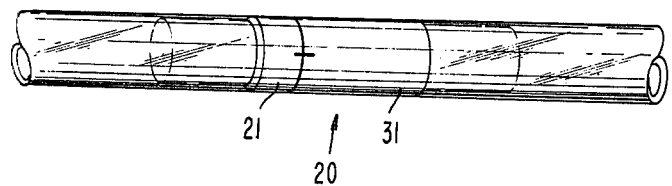
FIG. 1 is a perspective view of a mechanical coupler in a mated configuration made in accordance with the principles of the present invention.
Figure 2:
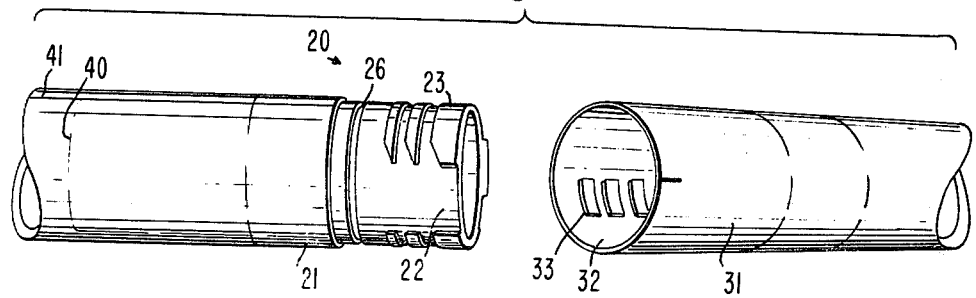
FIG. 2 shows a perspective view of the coupler of FIG. 1 having the coupling sections demated.

Refering now to FIG. 1 there is shown a perspective view of a mechanical coupler 20 made in accordance with the principles of the present invention. Referring to FIG. 2, which shows a perspective view of the unmated coupling sections of the coupler of FIG. 1, the coupler 20 generally comprises a first cylindrical section 21 (male) which must be made of a non-magnetic material such as titanium, plastic, or the like. The mating portion 22 of the first cylindrical section 21 has its outer surface configured so as to have an interrupted screw portion 23 thereon. An interrupted screw is generally known as a screw whose surface is divided longitudinally into several blank or cutaway sections so that the screw may be slipped into the reciprocally made nut, or the like, and locked by a fraction of a turn. The principle is employed generally in the breech mechanisms of certain guns, or the like.

Figure 3A:
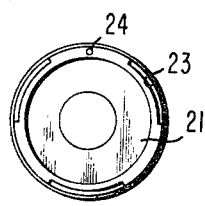
FIGS. 3a and 3b show end views of the male and female coupling sections of the coupler of FIG. 1.
Figure 3B:
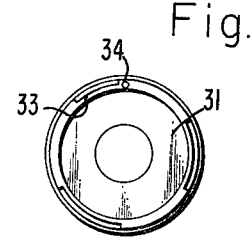
Figure 4:
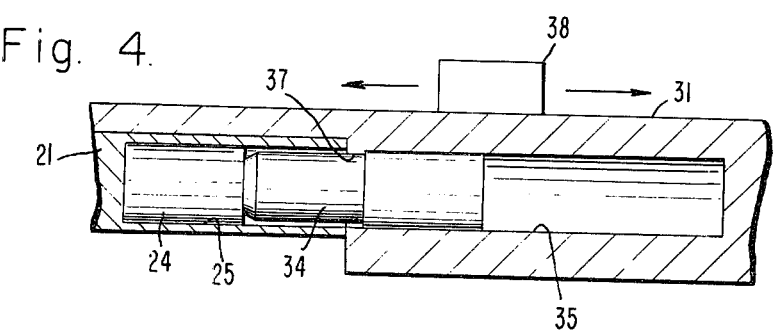
FIG. 4 shows the magnetic locking section of the present invention in an engaged position.

Referring to FIG. 3a which shows the end view of the first cylindrical section 21, and to FIG. 4 which shows an enlarged view of the magnetic locking section, a permanent magnet 24, which may be of samarium-cobalt composition, or the like, is disposed in one end of the first section 21 at the bottom of a first cylindrical chamber 25 adjacent to the interrupted screw portion 23. The permanent magnet 24 may be bonded into the first cylindrical chamber 25 by means of glue or the like. Also, an O-ring 26 (FIG. 2) is provided for sealing purposes, or the like, and is disposed in a groove adjacent to the interrupted screw portion 23.

As shown in FIG. 2, a second non-magnetic cylindrical section 31 (female) has an inner surface 32 which has an interrupted screw portion 33 which reciprocally mates with the interrupted screw portion 23 of the first section 21. The two sections 21, 31 may be locked by rotating the second section 31 a fraction of a turn, and in the specific embodiment, approximately 60 degrees in a clockwise direction. The 60 degree rotation allows the two interrupted screw portions 23, 33 to mate thus preventing longitudinal motion between the two cylindrical sections 21, 31.

Referring to FIG. 4, a movable magnetic plunger 34 is captively disposed in one end of the second cylindrical section 31 in a second cylindrical chamber 35. The plunger 34 is free to enter the first cylindrical chamber 25 once the second section 31 is locked relative to the first section 21 by means of the 60-degree rotation thereof. Once the plunger 34 has entered the first cylindrical chamber 25, relative rotation between the first and second sections 21, 31 is precluded.

FIG. 4 is an enlarged view showing the magnetic locking portion of the present invention and the operation thereof. FIG. 4 shows the magnetic plunger 34 captivated in the second cynlindrical chamber 35 by means of a crimped or staked area 37. Rotating the second cylindrical section 31 relative to the first cylindrical section 21 into the locked position, allows the magnetic plunger 37 to be attracted by the magnet 24. The magnetic attraction causes the plunger 37 to enter into the first cylindrical chamber 25, thus precluding any further relative rotary motion between the first and second cylindrical sections 21, 31.

In order to disengage the magnetic plunger 34 from the magnet 24, it is necessary to provide an external magnet 38 which is substantially stronger than the magnet 24. By placing the external magnet 38 substantially in the position shown and sliding the external magnet 38 to the right, the magnetic forces exerted by the external magnet 38 on the plunger 34 allows the withdrawal of the plunger 34 from the first cylindrical chamber 25. Accordingly, the first and second cylindrical sections 21, 31 may be derotated in order to disengage the interrupted screw portions 23, 33.

In the mating operation, once the two sections 21, 31 have been engaged and rotated so that the magnetic plunger 34 is free to enter the first cylindrical chamber 25, the mechanical coupling 20 is precluded from disengagement. Generally only a very strong rotational force would break or shear the magnetic plunger 34 which would allow any rotation of the two section 31, relative to one another. Under general operating conditions of a towed array, for example, almost no rotational forces exist and only longitudinal stretching or drag forces exist due to the towing of the towed array itself.

Additionally, once the two sections 21, 31 have been mated, the outer surface of the mechanical coupler 20 is relatively smooth and streamlined in design. In the case of the towed array, this provides for less turbulence and hence less self-noise generated by the turbulence. The mechanical coupling 20 is self-sealing due to the use of the O-ring 26 and by using a metal such as titanium, the coupler 20 is generally corrosion resistant and highly durable in terms of underwater use, or the like.

Figure 5:
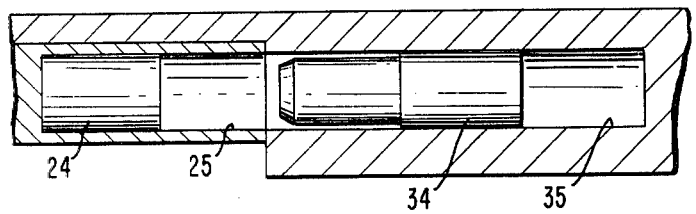
FIG. 5 shows the magnetic locking section of the present invention with the locking plunger disengaged.
Figure 6:
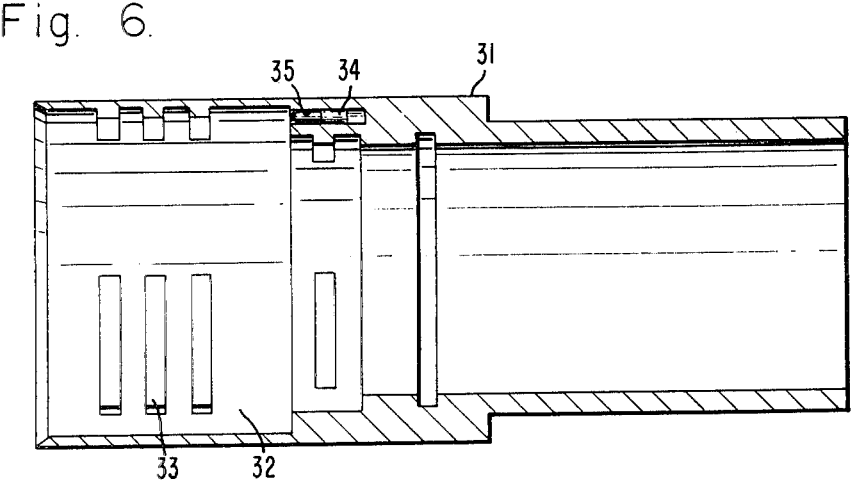
FIG. 6 shows a cutaway view of the female coupling section of the present invention.
Figure 7:
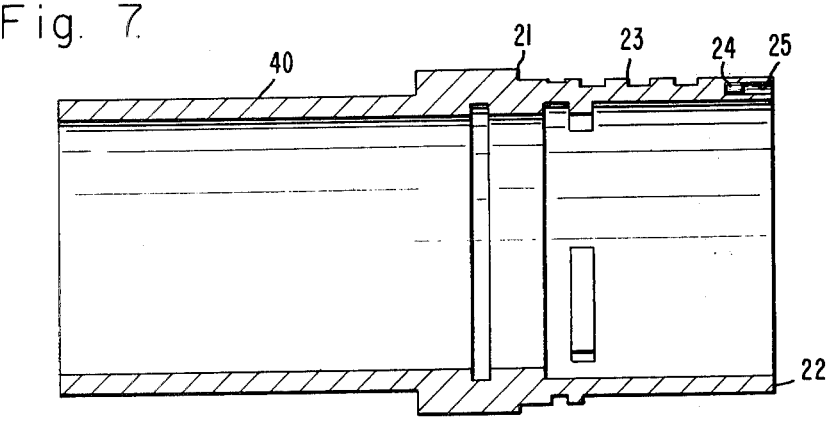
FIG. 7 shows a cutaway view of the male coupling section of the present invention.

FIG. 5 shows the magnetic locking section with the plunger 34 withdrawn from the first cylindrical chamber 25, while FIGS. 6 and 7 show enlarged cutaway views of the second and first coupling sections 31, 21, respectively. Referring to FIG. 7, and for the purpose of clarity, the back end of 40 of the first coupling section 21 is shown as a smooth cylindrical surface. This area need not be smooth, and in general will be a crimped area of sorts which will allow for the securing of an outer protective sheath (FIG. 2). These comments also hold true for the second coupling section 31.

Thus there has been described a mechanical coupler which is generally streamlined in design, corrosion resistant, self-sealing, and lockable by means of a magnetic locking arrangement which precludes relative rotation between the mated members of the mechanical coupler. The coupler is designed for rapid assembly and disassembly and requires no tools for the assembly operation.

It is to understood that the above-described embodiment is merely illustrative but a small number of specific embodiments which represent applications of the principles of the present invention. Clearly, numerous and varied other arrangements can be readily devised in accordance with these principles by those skilled in the art without departing from the spirit and scope of the invention.

What is claimed is:

1. A mechanical coupler comprising:
    a first non-magnetic cylindrical section having an inner and an outer surface, said outer surface having an interrupted screw portion thereof;
    a permanent magnet disposed in one end of said first section at the bottom of a first cylindrical chamber adjacent to said interrupted screw portion;
    a second non-magnetic cylindrical section having an inner and an outer surface, said inner surface having interrupted screw portion thereof for reciprocally mating with the interrupted screw portion of said first section and locking by a fraction of a turn thereof; and
    a movable magnetic plunger captively disposed in one end of the second section in a second cylindrical chamber, said plunger being slidably disposed therein, said plunger being free to enter said first cylindrical chamber when said second section is aligned with and locked relative to said first section by said fraction of a turn thereof, thereby preventing further relative rotation between said first and second sections.

2. A mechanical coupler comprising a first non-magnetic cylindrical section having an inner and an outer surface, said outer surface having a interrupted screw portion thereof and a second non-magnetic cylindrical section having an inner and an outer surface, said inner surface having an interrupted screw portion thereof for reciprocally mating with the interrupted screw portion of said first section and locking by a fraction of a turn thereof, wherein the improvement comprises:
    a permanent magnet disposed on one end of said first section at the bottom of a first cylindrical chamber adjacent to said interrupted screw portion; and
    a movable magnetic plunger captively disposed in one end of said section in a second cylindrical chamber, said plunger being slidably disposed therein, said plunger being free to enter said first cylindrical chamber when said second section is aligned with and locked relative to said first section by said fraction of a turn thereof, thereby preventing further relative rotation between said first and second sections.

3. The mechanical coupler of claims 1 or 2 further comprisng an O-ring seal disposed in said first section adjacent to said interrupted screw portion for preventing the intrusion of external liquids or gases into the interior of said mechanical coupler.

* * * * *